United States Patent
Wu et al.

(10) Patent No.: US 7,164,249 B2
(45) Date of Patent: Jan. 16, 2007

(54) FAN CONTROL DEVICE AND METHOD

(75) Inventors: Chia-Feng Wu, Taoyuan Hsien (TW); Cheng-Chieh Liu, Taoyuan Hsien (TW); Ching-Sen Hsieh, Taoyuan Hsien (TW); Tsung-Jung Hsieh, Taoyuan Hsien (TW); Yueh-Lung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/355,100

(22) Filed: Feb. 16, 2006

(65) Prior Publication Data

US 2006/0263072 A1 Nov. 23, 2006

(30) Foreign Application Priority Data

May 19, 2005 (TW) .............................. 94116203 A

(51) Int. Cl.
*H02P 3/00* (2006.01)
(52) U.S. Cl. ...................... 318/471; 318/254; 318/268; 318/599; 388/827
(58) Field of Classification Search ................ 318/138, 318/245, 254, 439, 599; 388/811, 819; 363/41
See application file for complete search history.

(56) References Cited

U.S. PATENT DOCUMENTS

| | | | | |
|---|---|---|---|---|
| 5,675,464 | A * | 10/1997 | Makaran et al. ............... | 361/23 |
| 6,617,815 | B1 * | 9/2003 | Krief ........................... | 318/471 |
| 6,650,074 | B1 * | 11/2003 | Vyssotski et al. ........... | 318/254 |
| 6,700,339 | B1 * | 3/2004 | Vyssotski et al. ........... | 318/254 |
| 6,747,432 | B1 * | 6/2004 | Yoshimura ................... | 318/559 |
| 6,771,119 | B1 * | 8/2004 | Ochi ........................... | 327/552 |
| 6,879,120 | B1 * | 4/2005 | Xi ............................... | 318/254 |
| 2003/0222608 | A1 * | 12/2003 | Vyssotski et al. ........... | 318/254 |
| 2004/0164692 | A1 * | 8/2004 | Xi ............................... | 318/268 |

* cited by examiner

*Primary Examiner*—Paul Ip
(74) *Attorney, Agent, or Firm*—Birch, Stewart, Kolasch & Birch, LLP

(57) ABSTRACT

A fan control device receives a reference revolution signal to control the rotation speed of a fan. The fan control device includes a reference signal generating module, a revolution modifying module and a fan driving module. The reference signal generating module generates a first reference signal and a second reference signal. The revolution modifying module receives the first reference signal and the second reference signal, and generates a target revolution signal according to the reference revolution signal and the first and second reference signals. The fan driving module receives the target revolution signal and generates a driving signal to drive the fan according to the target revolution signal.

18 Claims, 8 Drawing Sheets

FAN CONTROL DEVICE AND METHOD

BACKGROUND OF THE INVENTION

1. Field of the Invention

The invention relates to a fan control device and a fan control method.

2. Related Art

Fans are installed in various types of electrical devices to facilitate the heat dissipation in these devices by adjusting the rotation speed of the fan using a proper fan control device.

Referring to FIG. 1A, a conventional fan control device includes an impeller sensor 11, a driving chip 12 and a digital-to-analog converter 13. The impeller sensor 11 measures a position of an impeller of a fan 14 and generates a measurement value 111 according to the position of the impeller. The driving chip 12 receives the measurement value 111 and generates a control signal 121 to control the motor coils of the fan 14 to alternately work and thus to make the fan 14 rotate continuously according to the measurement value 111. The digital-to-analog converter 13 converts a pulse width modulation signal 131 into a direct current (DC) signal 132 to drive the motor coils of the fan 14 to work alternately.

In addition, referring to FIG. 1B, another conventional fan control device includes an impeller sensor 15, a digital-to-analog converter 16 and a driving chip 17. The impeller sensor 15 measures a position of an impeller of a fan 18 and generates a measurement value 151 according to the position of the impeller. The digital-to-analog converter 16 converts a pulse width modulation signal 161 into a DC signal 162. The driving chip 17 receives the measurement value 151 and the DC signal 162, and generates a driving signal 171 to drive the motor coils of the fan 18 to work alternately according to the measurement value 151 and the DC signal 162.

As shown in FIGS. 1A, 1B, 2A and 2B, the voltage value or the width ratio between the voltage pulses in the conventional pulse width modulation signal 131 (or 161) may represent a target rotation speed of the fan 14 (or 18). The voltage value of the DC signal 132 (or 162) generated by the digital-to-analog converter 13 (or 16) varies linearly according to the voltage value or the width ratio between the voltage pulses of the pulse width modulation signal 131 (or 161). Thus, the fan 14 (or 18) is driven to generate different rotation speeds. The actual rotation speed of the fan 14 (or 18) may be controlled at the target rotation speed represented by the pulse width modulation signal 131 (or 161), and the relationship between the actual rotation speed and the target rotation speed of the fan 14 (or 18) is made linear.

However, the motor of the fan 14 (or 18) may be affected by, for example, hysteresis, friction forces or inertia. Accordingly, the perfectly linear relationship L1 between the actual rotation speed and the target rotation speed of the fan 14 (or 18) does not exist. Instead, the relationship therebetween corresponds to a curve L2 concave upwards or a curve L3 concave downwards, and the actual rotation speed of the fan 14 (or 18) cannot be precisely controlled.

Therefore, it is an important subject of the invention to provide a fan control device and a fan control method for precisely controlling the actual rotation speed of the fan according to the target rotation speed of the fan and thus improving the problem caused by the nonlinear relationship between the actual rotation speed and the target rotation speed of the fan.

SUMMARY OF THE INVENTION

In view of the foregoing, the invention is to provide a fan control device and a fan control method for precisely controlling a rotation speed of a fan.

To achieve the above, a fan control device of the invention receives a reference revolution signal to control a rotation speed of a fan. The fan control device includes a reference signal generating module, a revolution modifying module and a fan driving module. The reference signal generating module generates a first reference signal and a second reference signal. The revolution modifying module receives the first reference signal and the second reference signal and generates a target revolution signal according to the reference revolution signal, the first reference signal and the second reference signal. The fan driving module receives the target revolution signal and generates a driving signal to drive the fan according to the target revolution signal.

In addition, a fan control method of the invention receives a reference revolution signal to control a rotation speed of a fan. The method includes the steps of: generating a first reference signal and a second reference signal, generating a target revolution signal according to the reference revolution signal, the first reference signal and the second reference signal, and generating a driving signal to drive the fan according to the target revolution signal.

As mentioned above, the fan control device of the invention has the revolution modifying module for generating the target revolution signal according to the reference revolution signal, the first reference signal and the second reference signal. Then, the fan driving module can generate the driving signal to drive the fan according to the target revolution signal. Thus, the actual rotation speed of the fan can be precisely controlled at the target rotation speed represented by the reference revolution signal. Besides, the nonlinear relationship between the actual rotation speed of the fan and the target rotation speed represented by the reference revolution signal may be improved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
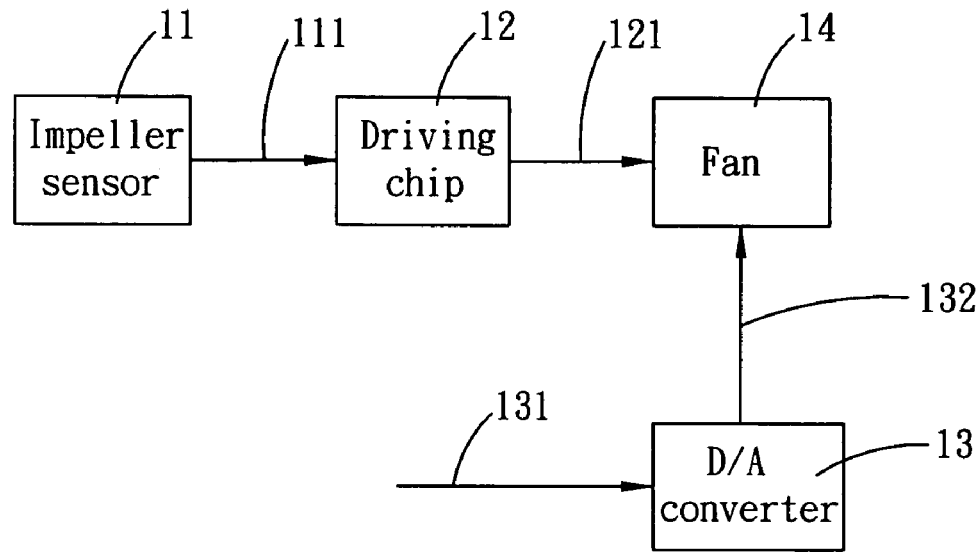
FIGS. 1A and 1B are block diagrams showing two conventional fan control devices.
Figure 1B:
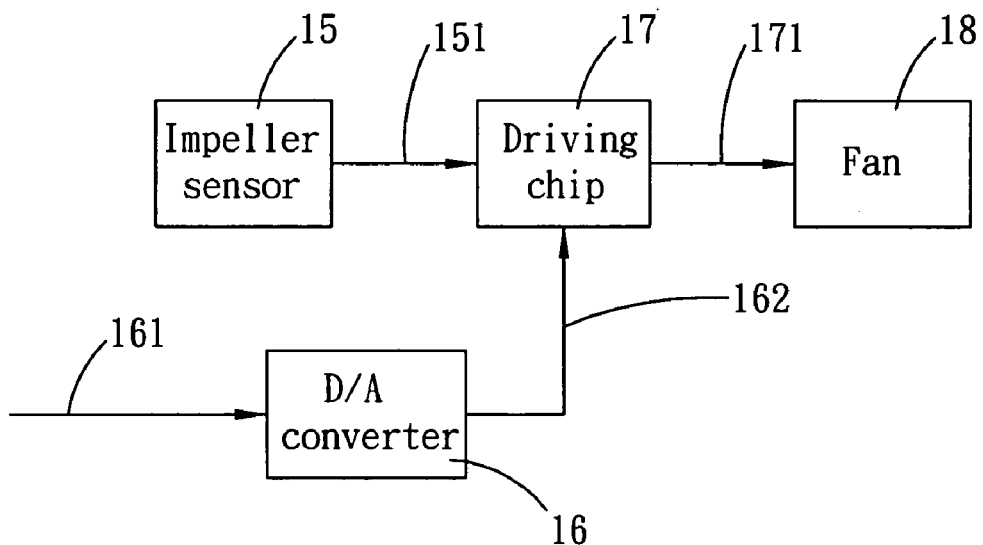
Figure 2A:
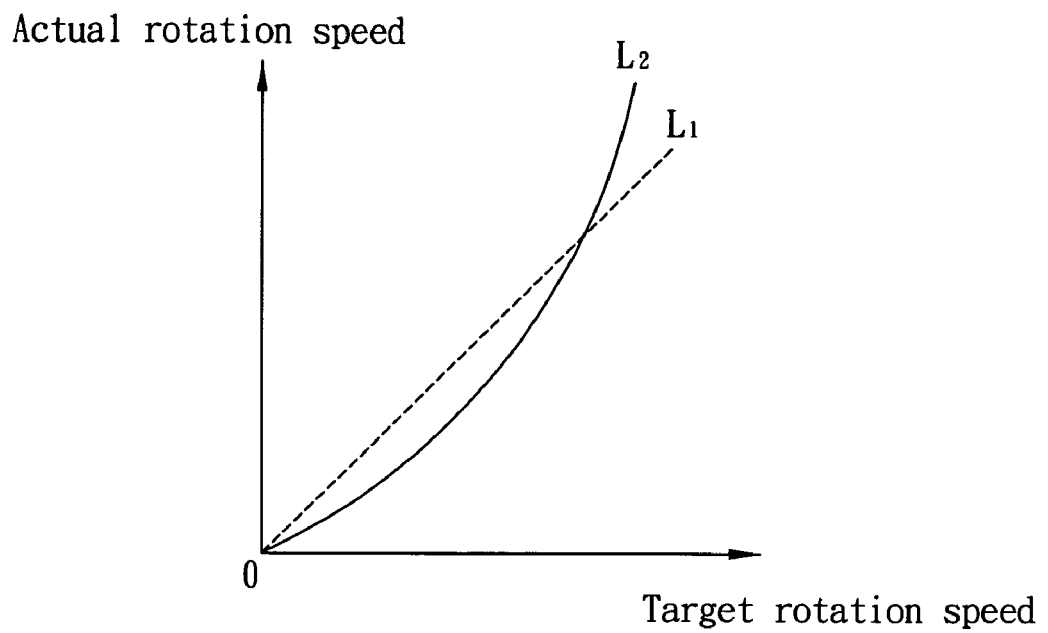
FIGS. 2A and 2B show the relationships between an actual rotation speed and a target rotation speed of the fans equipped with the conventional fan control devices.
Figure 2B:
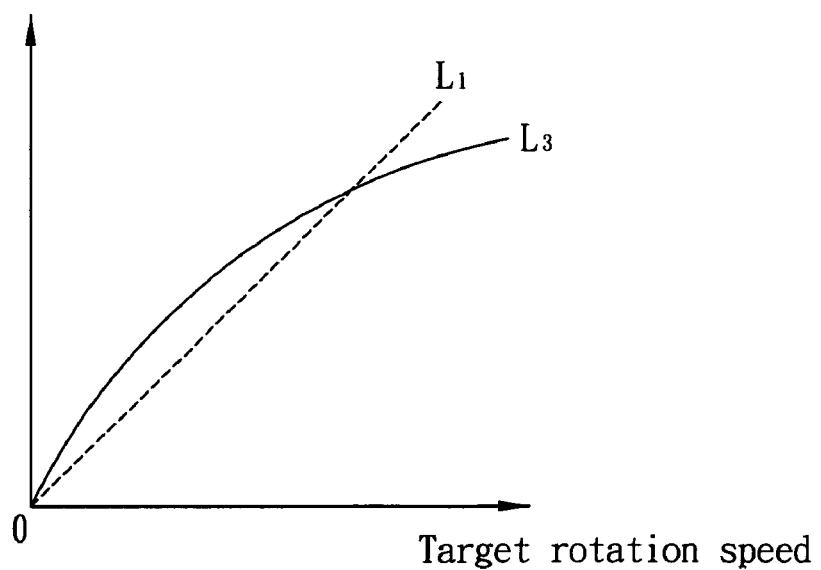
Figure 3:
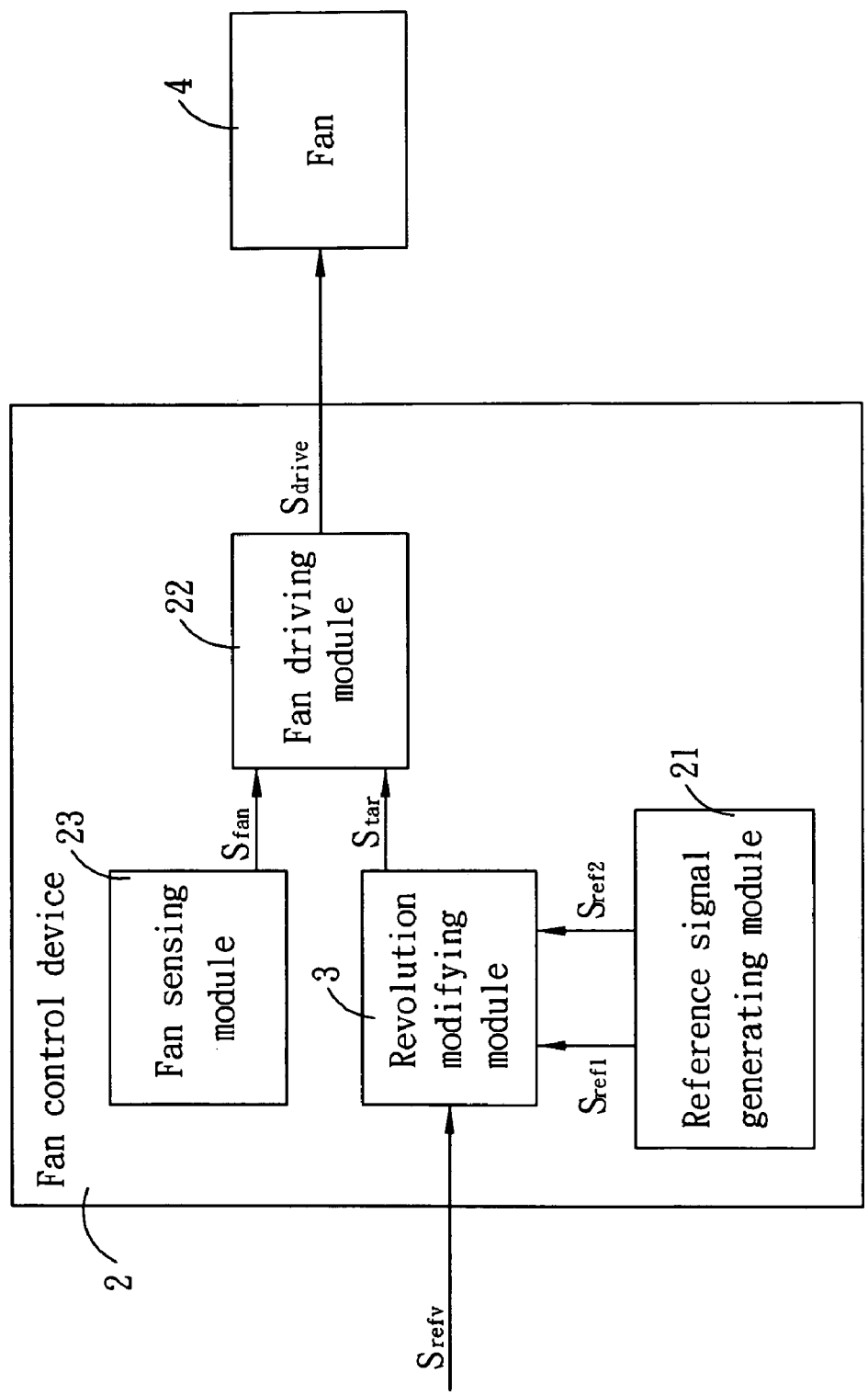
FIG. 3 is a block diagram showing a fan control device according to a preferred embodiment of the invention.

With reference to FIG. 3, a fan control device 2 according to a preferred embodiment of the invention receives a reference revolution signal $S_{refv}$ to control a rotation speed of a fan 4. The fan control device 2 includes a reference signal generating module 21, a revolution modifying module 3 and a fan driving module 22.

The reference signal generating module 21 generates a first reference signal $S_{ref1}$ and a second reference signal $S_{ref2}$. The revolution modifying module 3 receives the first reference signal $S_{ref1}$ and the second reference signal $S_{ref2}$, and generates a target revolution signal $S_{tar}$ according to the reference revolution signal $S_{refv}$, the first reference signal $S_{ref1}$ and the second reference signal $S_{ref2}$. The fan driving module 22 receives the target revolution signal $S_{tar}$ and generates a driving signal $S_{drive}$ to drive the fan 4 according to the target revolution signal $S_{tar}$.

In addition, the fan control device 2 further includes a fan sensing module 23 for measuring a position of an impeller of the fan 4 and generating an impeller position signal $S_{fan}$ according to the position of the impeller. The fan driving module 22 generates the driving signal $S_{drive}$ to drive the fan 4 according to the target revolution signal $S_{tar}$ and the impeller position signal $S_{fan}$. In this embodiment, the fan driving module 22 generates the driving signal $S_{drive}$ to drive a first motor coil and a second motor coil of the fan 4 to work alternately.

In this embodiment, the reference signal generating module 21 and the revolution modifying module 3 may be program codes to be executed in a microcontroller, a microprocessor or a digital signal processor (DSP) to control the fan driving module 22 and the fan 4 by fireware. The reference revolution signal $S_{refv}$ may be a target rotation speed of the fan 4. The first reference signal $S_{ref1}$ and the second reference signal $S_{ref2}$ may be parameters or variables in the program codes. The target revolution signal $S_{tar}$ may be a drive voltage value when the fan 4 reaches the target rotation speed.

Alternatively, the revolution modifying module 3 may be directly composed of an electric circuit for controlling the fan driving module 22 and the fan 4 by hardware, and the reference signal generating module 21 may be an electric circuit, such as a power supply or a signal generator for generating a constant voltage level.

Figure 4A:
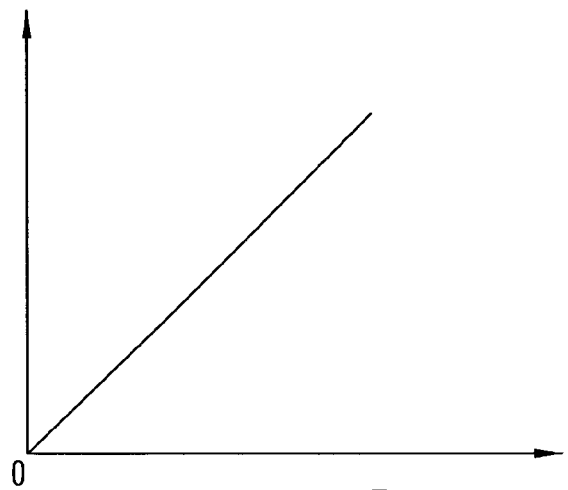
FIGS. 4A to 4F show relationships between an actual rotation speed and a target rotation speed of a fan equipped with the fan control device according to the preferred embodiment of the invention.
Figure 4B:
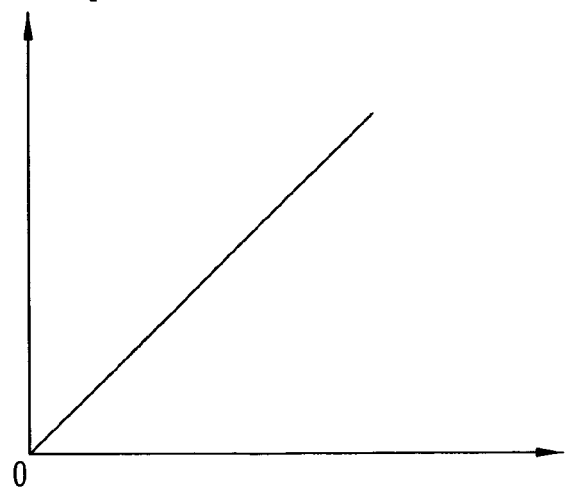
Figure 4C:
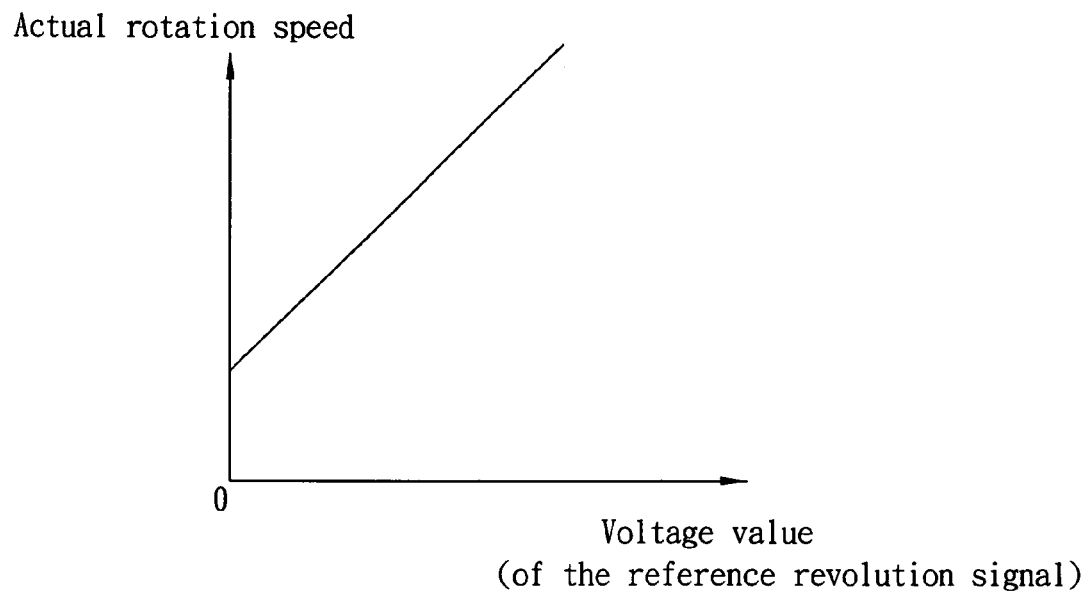
Figure 4D:
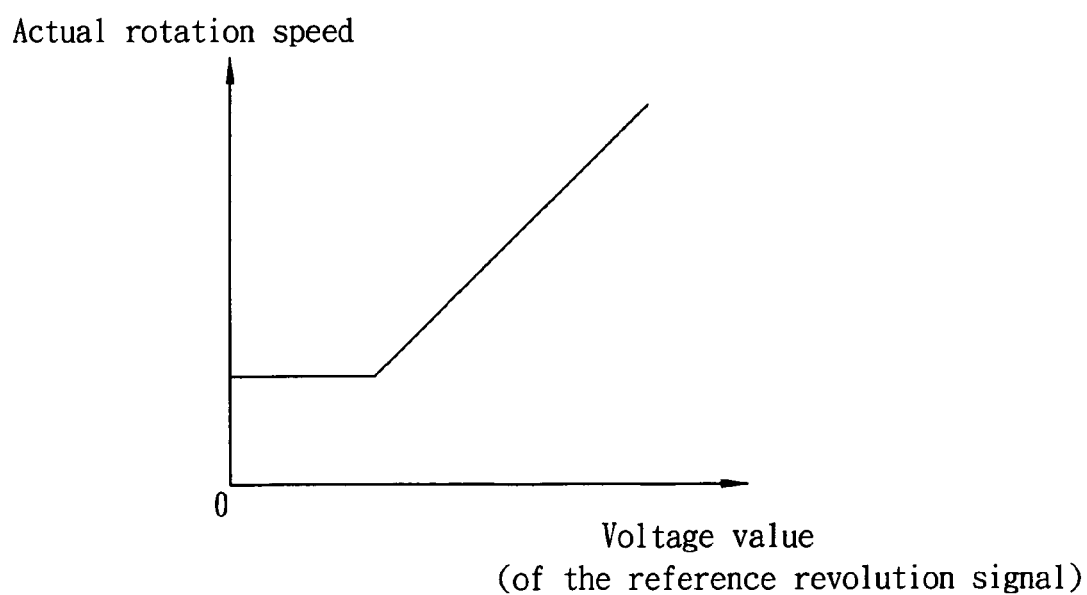
Figure 4E:
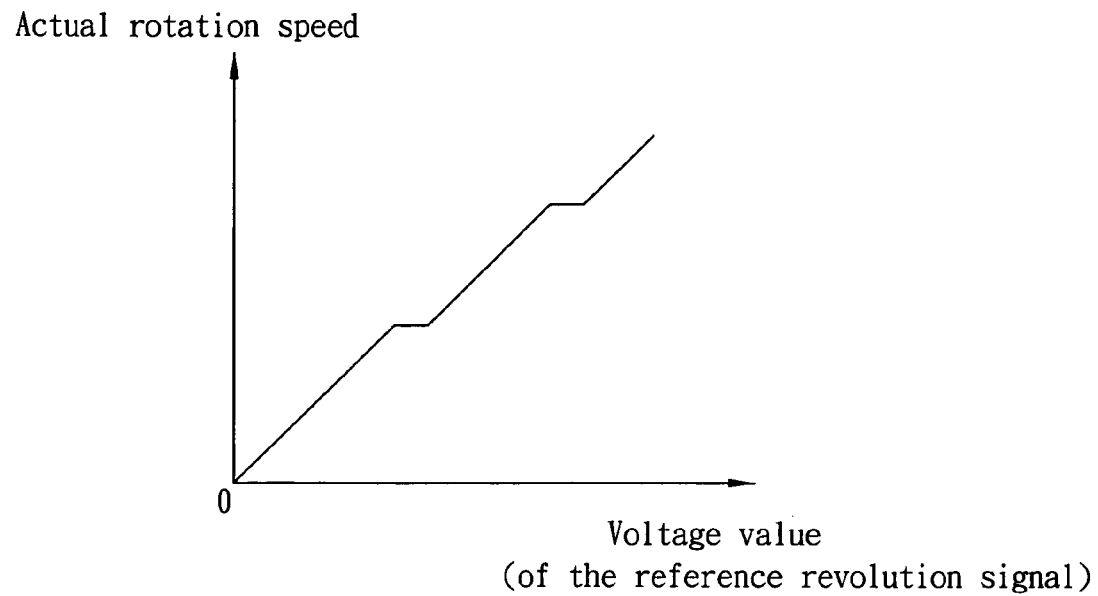
Figure 4F:
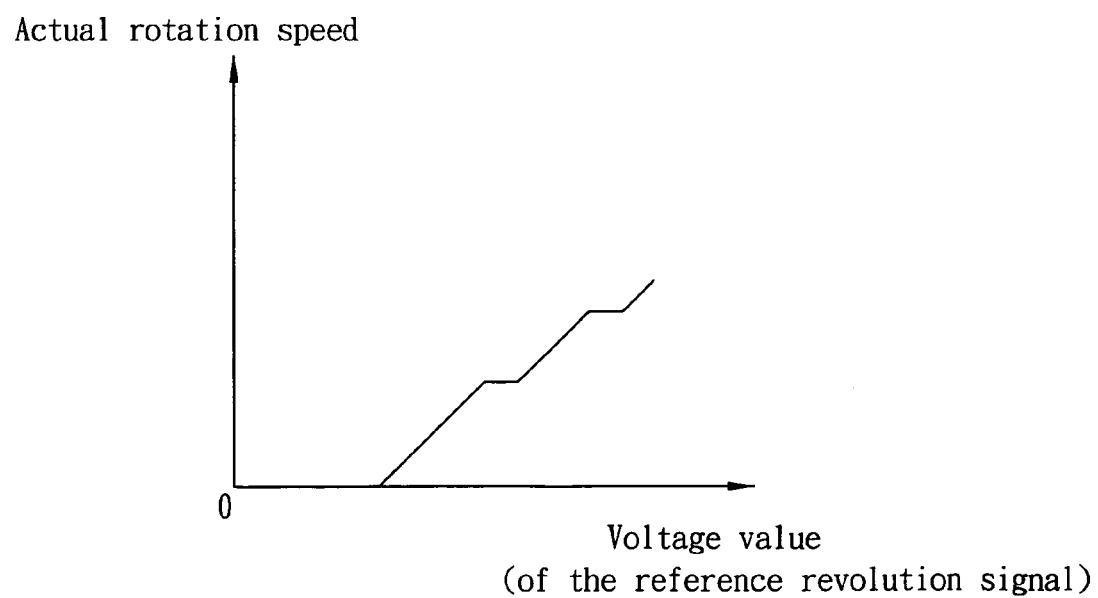

As shown in FIGS. 3, 4A and 4B, the reference revolution signal $S_{refv}$ in this embodiment may be a pulse width modulation signal. The first reference signal $S_{ref1}$ and the second reference signal $S_{ref2}$ may be DC voltage signals. In addition, the target revolution signal $S_{tar}$ may be a DC voltage signal.

The voltage value or the width between voltage pulses of the reference revolution signal $S_{refv}$ represents a target rotation speed of the fan 4. The voltage value of the target revolution signal $S_{tar}$ generated by the revolution modifying module 3 correspondingly changes according to the voltage value or the width ratio between the voltage pulses of the reference revolution signal $S_{refv}$, as well as according to the first reference signal $S_{ref1}$ and the second reference signal $S_{ref2}$.

The fan driving module 22 receives the target revolution signal $S_{tar}$ and generates the driving signal $S_{drive}$ to drive the fan 4 according to the target revolution signal $S_{tar}$. Thus, the actual rotation speed of the fan 4 may be controlled at the target rotation speed of the fan represented by the reference revolution signal $S_{refv}$, and the relationship between the actual rotation and the target rotation speed of the fan 4 is made linear. Besides, the relationship between the actual rotation speed of the fan 4 and the voltage value (or the width ratio between voltage pulses) of the reference revolution signal $S_{refv}$ is also made linear.

As shown in FIGS. 3, and 4A to 4F, adjusting the second reference signal $S_{ref2}$ in this embodiment may change the control property of the revolution modifying module 3. Thus, the relationship between the actual rotation speed of the fan 4 and the target rotation speed represented by the reference revolution signal $S_{refv}$ may be made linear, and the relationship between the actual rotation speed of the fan 4 and the voltage value (or the width ration between the voltage pulses) of the reference revolution signal $S_{refv}$ may be further diversified, such that the rotation speed of the fan 4 can be properly adjusted according to various requirements.

Figure 5:
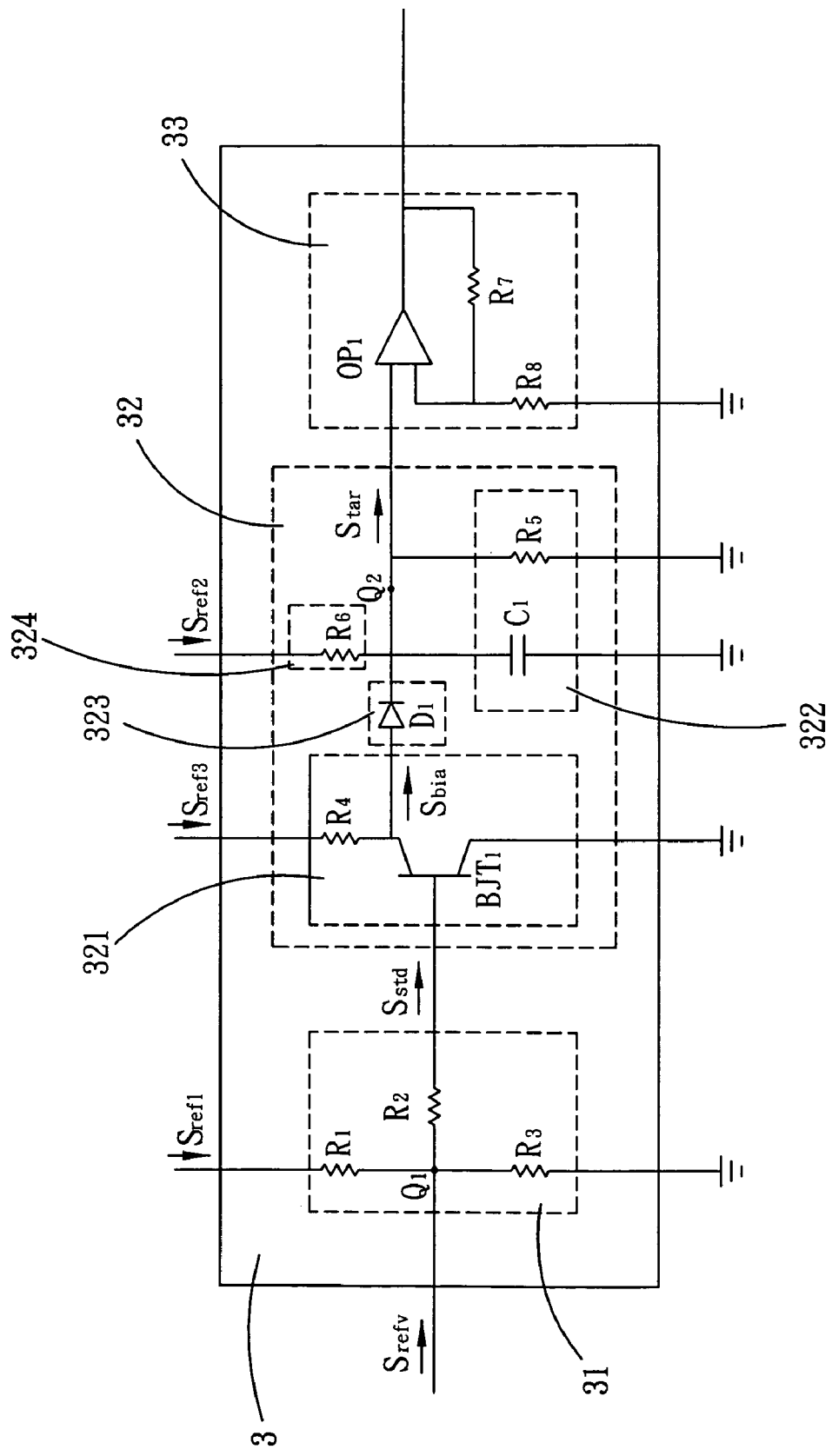
FIG. 5 is a block diagram showing a revolution modifying module in the fan control device according to the preferred embodiment of the invention.

Referring to FIG. 5, the revolution modifying module 3 of this embodiment includes a standard bias unit 31, a modification converting unit 32 and an amplifying unit 33.

The standard bias unit 31 generates a standard revolution signal $S_{std}$ according to the first reference signal $S_{ref1}$ and the reference revolution signal $S_{refv}$. In this embodiment, the standard bias unit 31 includes a plurality of resistors $R_1$ to $R_3$, which are electrically connected together at a point $Q_1$. The first reference signal $S_{ref1}$ is inputted to the resistor $R_1$ and the reference revolution signal $S_{refv}$ is inputted to the resistor $R_2$ to generate the standard revolution signal $S_{std}$.

The modification converting unit 32 receives the second reference signal $S_{ref2}$ and the standard revolution signal $S_{std}$, and generates the target revolution signal $S_{tar}$ according to the second reference signal $S_{ref2}$ and the standard revolution signal $S_{std}$.

On the other hand, the reference signal generating module 21 may generate a third reference signal $S_{ref3}$, and the modification converting unit 32 may generate the target revolution signal $S_{tar}$ according to the second reference signal $S_{ref2}$, the third reference signal $S_{ref3}$ and the standard revolution signal $S_{std}$.

In this embodiment, the modification converting unit 32 includes an input circuit 324, a bias circuit 321, an oscillation circuit 322 and a reverse protection circuit 323.

The bias circuit 321 receives the third reference signal $S_{ref3}$ and the standard revolution signal $S_{std}$, and generates a bias signal $S_{bia}$ according to the standard revolution signal $S_{std}$ and the third reference signal $S_{ref3}$. The oscillation circuit 322 receives the bias signal $S_{bia}$ and generates the target revolution signal $S_{tar}$ according to the bias signal $S_{bia}$.

In this embodiment, the bias circuit 321 includes a resistor $R_4$ and a transistor $BJT_1$. The resistor $R_4$ is electrically connected with a source of the transistor $BJT_1$. The third reference signal $S_{ref3}$ is inputted to the resistor $R_4$, the standard revolution signal $S_{std}$ is inputted to a base of the transistor $BJT_1$, and the bias signal $S_{bia}$ is generated and outputted at the source of the transistor $BJT_1$. In addition, the transistor $BJT_1$ may be a bipolar junction transistor, a field effect transistor, or other transistors.

The input circuit 324 receives the second reference signal $S_{ref2}$. In this embodiment, the input circuit 324 includes a resistor $R_6$, and the second reference signal $S_{ref2}$ is inputted to the resistor $R_6$.

The reverse protection circuit 323 is electrically connected between the bias circuit 321 and the oscillation circuit 322. In this embodiment, the reverse protection circuit 323 includes a diode $D_1$, which is electrically connected between the bias circuit 321 and the oscillation circuit 322. In addition, the diode $D_1$ may also be replaced with other high impedance elements.

The oscillation circuit 322 receives the bias signal $S_{bia}$ and is electrically connected with the input circuit 324 to generate the target revolution signal $S_{tar}$. In this embodiment, the oscillation circuit 322 includes a resistor $R_5$ and a capacitor $C_1$ connected in parallel with the resistor $R_5$. The resistor $R_5$, the capacitor $C_1$, the resistor $R_6$ and the diode $D_1$ of the reverse protection circuit 323 are electrically connected together at a point $Q_2$. The second reference signal $S_{ref2}$ is inputted to the resistor $R_6$, the bias signal $S_{bia}$ is inputted to the diode $D_1$, and the resistor $R_5$ and the capacitor $C_1$ generate the target revolution signal $S_{tar}$ at the point $Q_2$ according to the bias signal $S_{bia}$ and the second reference signal $S_{ref2}$.

As shown in FIGS. 3 and 5, the amplifying unit 33 for amplifying the target revolution signal $S_{tar}$ is electrically connected between the modification converting unit 32 and the fan driving module 22. In this embodiment, the amplifying unit 33 includes an amplifier $OP_1$, a resistor $R_7$ and a resistor $R_8$. The amplifier $OP_1$, the resistor $R_7$ and the resistor $R_8$ constitute an amplifier circuit, and the target revolution signal $S_{tar}$ is amplified by the amplifying unit 33 and then outputted to the fan driving module 22.

As shown in FIGS. 3, 4A to 4F, and 5, adjusting the second reference signal $S_{ref2}$, the third reference signal $S_{ref3}$, the resistor $R_5$ and the resistor $R_6$ in this embodiment can change the control property of the revolution modifying module 3. Thus, the relationship between the actual rotation speed of the fan 4 and the target rotation speed represented by the reference revolution signal $S_{refv}$ may be made linear, and the relationship between the actual rotation speed of the fan 4 and the voltage value (or the width ration between the voltage pulses) of the reference revolution signal $S_{refv}$ may be further diversified, such that the rotation speed of the fan 4 can be properly adjusted according to various requirements.

Figure 6:
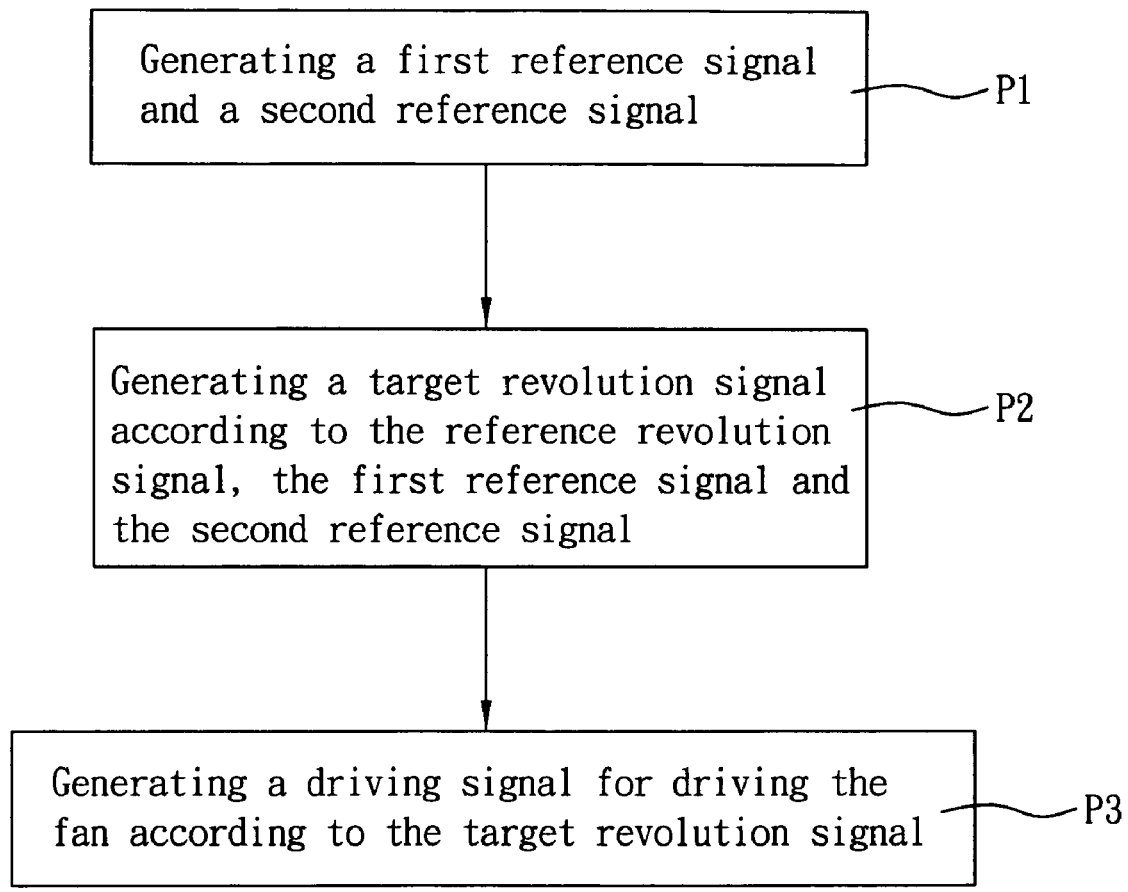
FIG. 6 is a flow chart showing a fan control method according to a preferred embodiment of the invention.

As shown in FIG. 6, a fan control method according to the preferred embodiment of the invention receives a reference revolution signal to control a rotation speed of a fan. The method includes the procedures P1 to P3.

In the procedure P1, a first reference signal and a second reference signal are generated.

In the procedure P2, a target revolution signal is generated according to the reference revolution signal, the first reference signal and the second reference signal. The procedure P2 can generate a standard revolution signal according to both the first reference signal and the reference revolution signal, and then generate the target revolution signal according to the second reference signal and the standard revolution signal.

In the procedure P3, a driving signal for driving the fan is generated according to the target revolution signal.

Because the fan control method of this embodiment may be applied to the fan control device of FIGS. 3 to 5 and the fan control method of this embodiment has been discussed in the fan control device mentioned in the preferred embodiment, the detailed descriptions thereof will be omitted for concise purpose.

In summary, the fan control device of the invention has the revolution modifying module for generating the target revolution signal according to the reference revolution signal, the first reference signal and the second reference signal, and the fan driving module can then generate the driving signal to drive the fan according to the target revolution signal. Thus, the actual rotation speed of the fan can be precisely controlled at the target rotation speed represented by the reference revolution signal, and the nonlinear relationship between the actual rotation speed of the fan and the target rotation speed represented by the reference revolution signal may be improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan control device, which receives a reference revolution signal to control a rotation speed of a fan, comprising:
    a reference signal generating module generating a first reference signal and a second reference signal;
    a revolution modifying module having a standard bias unit and a modification converting unit, wherein the standard bias unit generates a standard revolution signal according to the first reference signal and the reference revolution signal, and the modification converting unit generates a target revolution signal according to the second reference signal and the standard revolution signal; and
    a fan driving module receiving the target revolution signal and generates a driving signal to drive the fan according to the target revolution signal.

2. The fan control device according to claim 1, wherein the reference revolution signal is a pulse width modulation signal, and the first reference signal, the second reference signal and the target revolution signal are direct current (DC) voltage signals.

3. The fan control device according to claim 1, wherein the standard bias unit comprises:
    a first resistor for receiving the first reference signal; and
    a second resistor, which is electrically connected with the first resistor and receives the reference revolution signal for generating the standard revolution signal.

4. The fan control device according to claim 1, wherein the reference signal generating module generates a third reference signal, and the modification converting unit further generates the target revolution signal according to the second reference signal, the third reference signal and the standard revolution signal.

5. The fan control device according to claim 4, wherein the modification converting unit comprises:
    a bias circuit, which receives the third reference signal and the standard revolution signal and generates a bias signal according to the standard revolution signal and the third reference signal;
    an input circuit, which receives the second reference signal; and
    an oscillation circuit, which is electrically connected with the input circuit and receives the bias signal for generating the target revolution signal.

6. The fan control device according to claim 5, wherein the bias circuit comprises:
    a third resistor, which receives the third reference signal; and
    a transistor, which has a base electrically connected with the standard bias unit to receive the standard revolution signal, and a source electrically connected with the third resistor to generate the bias signal according to the third reference signal and the standard revolution signal.

7. The fan control device according to claim 5, wherein the input circuit comprises a fourth resistor for receiving the second reference signal.

8. The fan control device according to claim 7, wherein the oscillation circuit comprises:
   a fifth resistor, which is electrically connected with the fourth resistor; and
   a first capacitor, which is electrically connected with the fourth resistor and connected in parallel with the fifth resistor for receiving the bias signal and generating the target revolution signal according to the bias signal and the second reference signal.

9. The fan control device according to claim 5, wherein the modification converting unit further comprises a reverse protection circuit electrically connected between the bias circuit and the oscillation circuit.

10. The fan control device according to claim 9, wherein the reverse protection circuit comprises a first diode electrically connected between the bias circuit and the oscillation circuit.

11. The fan control method according to claim 5, wherein the step of generating the reference signal is to generate a third reference signal, and the step of generating the target revolution signal is to generate the target revolution signal according to the third reference signal.

12. The fan control device according to claim 1, wherein the revolution modifying module further comprises an amplifying unit electrically connected between the modification converting unit and the fan driving module for amplifying the target revolution signal.

13. The fan control device according to claim 12, wherein the amplifying unit comprises:
   a sixth resistor, which has a first terminal grounded;
   an amplifier, which has an first input terminal electrically connected with the modification converting unit, a second input terminal electrically connected with the sixth resistor, and an output terminal electrically connected with the fan driving module, wherein the amplifier amplifies the target revolution signal; and
   a seventh resistor, which is electrically connected between the output terminal of the amplifier and the second input terminal of the amplifier.

14. The fan control device according to claim 1, further comprising:
   a fan sensing module, which measures a position of an impeller of the fan and generates an impeller position signal according to the position of the impeller, wherein the fan driving module generates the driving signal to drive the fan according to the target revolution signal and the impeller position signal.

15. A fan control method, which receives a reference revolution signal to control a rotation speed of a fan, the method comprising the steps of:
   generating a first reference signal and a second reference signal;
   generating a standard revolution signal according to the first reference signal and the reference revolution signal;
   generating the target revolution signal according to the second reference signal and the standard revolution signal; and
   generating a driving signal to drive the fan according to the target revolution signal.

16. The fan control method according to claim 15, wherein the reference revolution signal is a pulse width modulation signal, and the first reference signal, the second reference signal and the target revolution signal are direct current (DC) voltage signals.

17. The fan control method according to claim 15, further comprising a step of:
   measuring a position of an impeller of the fan and generating an impeller position signal according to the position of the impeller.

18. The fan control method according to claim 17, wherein the step of generating the driving signal is to drive the fan further according to the impeller position signal.

* * * * *